(12) United States Patent
Toyoda et al.

(10) Patent No.: US 6,668,150 B2
(45) Date of Patent: Dec. 23, 2003

(54) OIL COATING ROLLER, SEAL RING USED FOR THE ROLLER, AND FIXING DEVICE USING THE SEAL RING

(75) Inventors: Akinori Toyoda, Katano (JP); Noriyuki Tajima, Hirakata (JP); Michihiro Sima, Osaka (JP); Yoshihiro Nakayama, Kawachi-gun (JP); Takumi Kitano, Utsunomiya (JP)

(73) Assignees: Matsushita Electric Industrial Co., Ltd., Osaka (JP); Matsushita Graphic Communication Systems, Inc., Tokyo (JP)

(*) Notice: Subject to any disclaimer, the term of this patent is extended or adjusted under 35 U.S.C. 154(b) by 0 days.

(21) Appl. No.: 10/168,254

(22) PCT Filed: Dec. 14, 2000

(86) PCT No.: PCT/JP00/08913
§ 371 (c)(1),
(2), (4) Date: Jun. 17, 2002

(87) PCT Pub. No.: WO01/44878
PCT Pub. Date: Jun. 21, 2001

(65) Prior Publication Data
US 2002/0181978 A1 Dec. 5, 2002

(30) Foreign Application Priority Data
Dec. 17, 1999 (JP) .......................................... 11/359280

(51) Int. Cl.⁷ ............................................. G03G 15/20
(52) U.S. Cl. ........................................................ 399/325
(58) Field of Search ................................. 399/324, 325; 492/17, 18

(56) References Cited

U.S. PATENT DOCUMENTS

| 4,040,383 | A | * | 8/1977 | Vandervort | 399/325 |
| 4,086,871 | A | * | 5/1978 | Rydeen et al. | 399/325 |
| 5,534,986 | A | * | 7/1996 | Irro et al. | 399/325 |
| 6,047,157 | A | * | 4/2000 | Tatematsu et al. | 399/325 |

FOREIGN PATENT DOCUMENTS

| JP | 60-136782 | 7/1985 |
| JP | 61-104469 | 7/1986 |
| JP | 61-183679 | 8/1986 |
| JP | 62-178992 | 8/1987 |
| JP | 1-60144 | 12/1989 |
| JP | 5-123623 | 5/1993 |
| JP | 11-95597 | 4/1999 |
| JP | 11-219059 | 8/1999 |

* cited by examiner

*Primary Examiner*—Fred L. Braun
(74) *Attorney, Agent, or Firm*—Merchant & Gould, P.C.

(57) ABSTRACT

An oil application roller capable of preventing an oil leak when the roller is left in the state where the rotation axis thereof runs vertically and also capable of preventing an oil escape from the roller in a fixing device. The oil application roller (15) includes a seal ring (25) at respective end portions of the roller (15). The seal ring (25) includes a vent hole (26) extending from an end face of the roller (15) to the outside of the seal ring (25), and the cross-sectional area of the vent hole is not less than 0.01 mm² and not more than 1 mm².

11 Claims, 6 Drawing Sheets

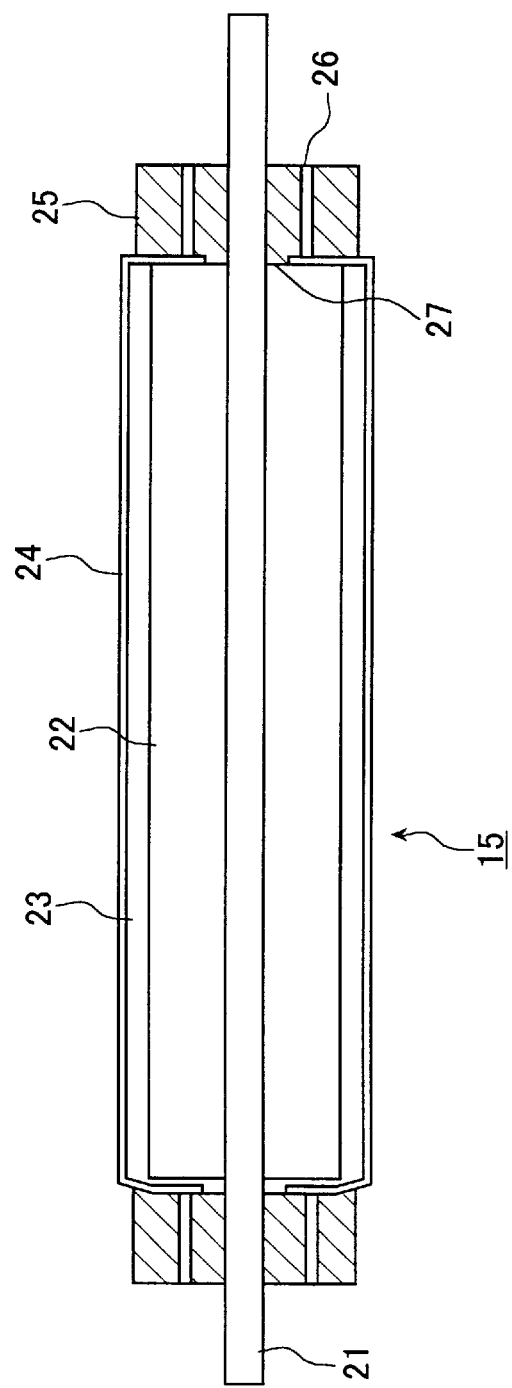
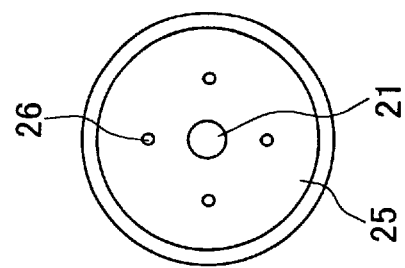
FIG. 2A
FIG. 2B

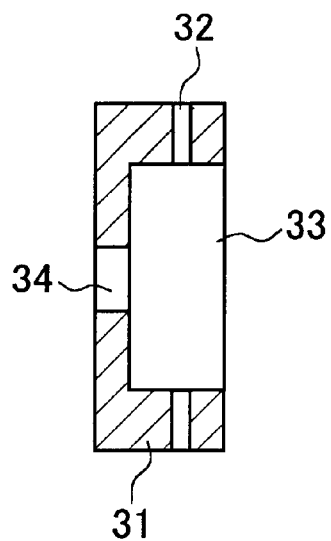
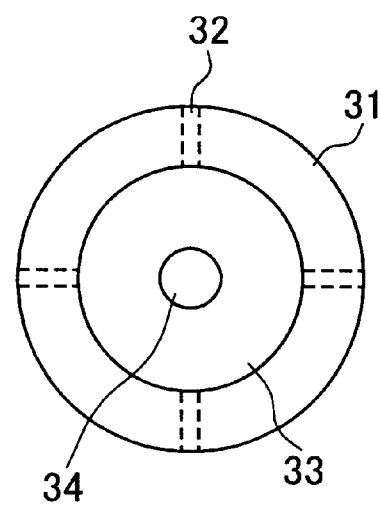
FIG. 3A　　　　　　FIG. 3B
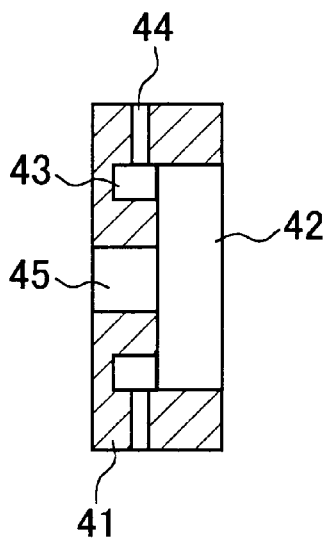
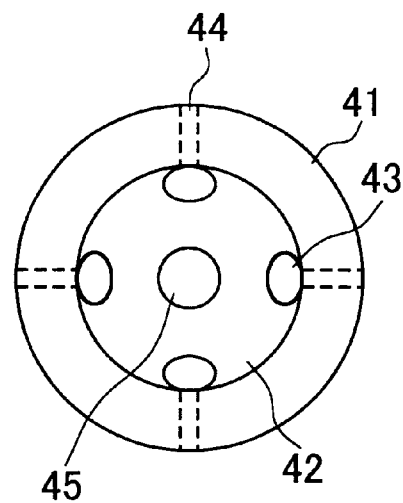
FIG. 4A　　　　　　FIG. 4B

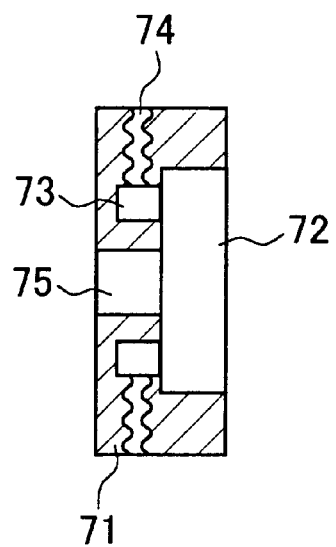
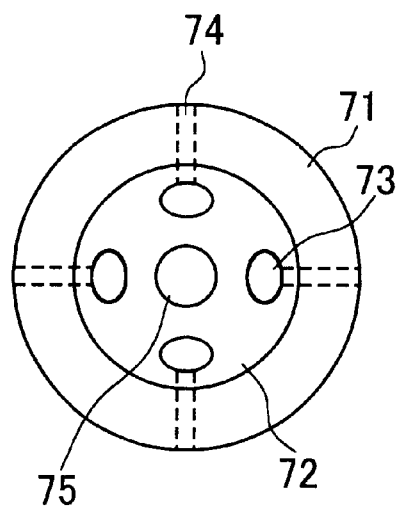
FIG. 7A  FIG. 7B
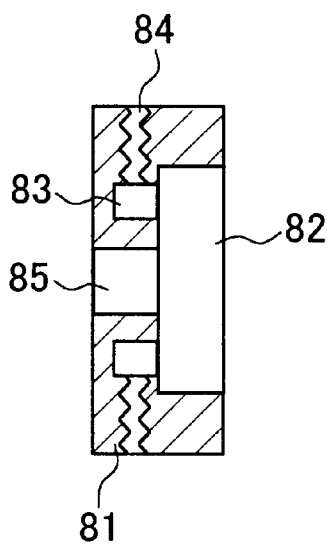
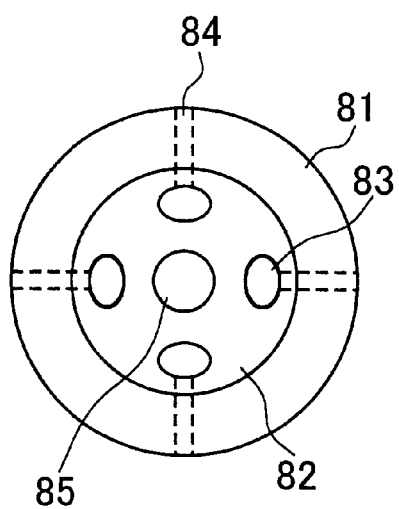
FIG. 8A  FIG. 8B

OIL COATING ROLLER, SEAL RING USED FOR THE ROLLER, AND FIXING DEVICE USING THE SEAL RING

TECHNICAL FIELD

The present invention relates to an oil application roller for applying release oil to a fixing roller of a fixing device for use in monochrome printers, color printers, copying machines, facsimile machines, etc. The present invention also relates to a seal ring for use in the oil application roller and a fixing device using the oil application roller.

BACKGROUND ART

Color toner for use in image forming apparatuses, such as copying machines, printers, and the like, for forming full-color images through an electrophotographic image forming process needs to have an excellent light transmittance when fixed on recording materials. Accordingly, heretofore, color toner based on a binder resin, which can melt quickly and has a low melt viscosity, has been used, and a method of fixing this color toner by a fixing device equipped with a silicone-rubber based heating roller as a fixing roller has been employed.

However, since the above-mentioned fixing device employs the fixing roller whose surface is formed of silicone rubber and the color toner based on a binder resin, which can melt quickly and has a low melt viscosity, "hot offset", a phenomenon in which melted color toner adheres to the surface of the fixing roller, is liable to occur. Therefore, to prevent the hot offset, a considerable amount of a release agent, e.g., silicone oil having a great affinity for silicone rubber and being relatively inexpensive, is applied to the surface of the fixing roller.

Also, in recent years, a release component is added to the toner itself to prevent the hot offset. In this case, however, application of the release agent is still necessary, although the amount of the release agent may be small.

Conventionally, oil application rollers in various roll shapes have been proposed as a member for applying oil to the members involved in a fixing operation or the like. One example is the oil application roller disclosed in JP 1(1989)-60144B. The oil application roller includes a pipe with a number of pores on its outer periphery, release oil held in the central portion of the pipe, and heat-resistant felt made of Nomex or the like wound around the outer periphery of the pipe. JP 61(1986)-104469U discloses an oil application roller in which heat-resistant felt is wound around a member covered with a porous material such as paper to control the amount of oil exuding from the felt and to diffuse the oil in the axial direction of the oil application roller so as to attain the uniform application of the oil throughout a fixing roller. JP 5(1993)-123623A discloses an oil application roller in which silicone rubber sponge or the like is provided as an intermediate layer so as to impart elasticity to the oil application roller. Further, JP 61(1986)-104469U discloses an oil application roller in which a heat-resistant porous material other than heat-resistant felt is used.

However, in these conventional oil application rollers, controlling the amount of oil applied to the fixing roller is difficult since the oil exuding from the felt or porous material provided on the surface of the oil application roller is applied directly to the fixing roller to migrate thereto. On this account, as an oil application roller capable of controlling the amount of oil applied to the fixing roller, there has been proposed an oil application roller in which a heat-resistant microporous film layer (oil permeation control layer) is provided on the surface of felt or a porous material, thereby controlling the amount of oil passing through the layer (JP 61(1986)-183679A). Further, as an oil application roller capable of applying a smaller amount of oil uniformly and with high accuracy, there has been proposed an oil application roller in which, in place of the microporous film, a composite film obtained by filling the pores in a microporous film with a mixture of silicone rubber and oil is used as an oil permeation control layer (JP 62(1987)-178992A).

However, in these conventional oil application rollers, the amount of oil supplied to the oil permeation control layer needs to be kept constant so that the oil permeation control layer can control the amount of oil passing therethrough stably. In addition, in order to attain a stable oil application over a long time period, these oil application rollers desirably include an oil holder with a two-layer structure including an oil supply layer and an oil diffusion layer.

In this case, a difference in osmotic pressure is required between the two layers so that oil can move. In addition, the porosity (the ratio of the volume of pores to the total volume) of the oil supply layer is required to be higher than that of the oil diffusion layer. Also, for an extended service life of the oil application rollers, the porosity of the oil supply layer is required to be high. However, an increase in the porosity of the oil supply layer results in a decrease in its oil holding power, thereby causing a problem that an oil leak is liable to occur. Moreover, if an oil tank is used instead of the oil supply layer, the risk of the oil leak further increases.

Furthermore, when release oil comes into contact with the microporous film or composite film used as an oil permeation control layer, the pores in the microporous film are closed by the release oil. As a result, if large volumes of gas are generated abruptly, smooth permeation of the gas becomes difficult. If the gas is forced to pass through the pores, a pressure of several millions of Pa is required, for example. For this reason, if the pore diameter of the microporous film is made smaller to decrease the amount of oil passing through the film, the higher pressure is required. Moreover, when the composite film as described above is used as an oil permeation control layer, it is difficult to allow the gas to pass though the film without breaking the film.

Furthermore, vapor pressure is created by the moisture absorbed in the oil and the porous material at the time of heating and cooling the members involved in a fixing operation. In addition, pressure also is created by the thermal expansion of air in the oil application roller. As a result, the oil permeation control layer is subjected to an excessive pressure. This may cause the oil to spout out, thereby increasing the amount of the oil applied initially. Further, in some cases, the oil permeation control layer may be broken or swollen like a balloon.

In order to prevent the above troubles, providing a vent hole, which allows the pressure inside the oil application roller to be released, in a seal ring provided at each end face of the oil application roller has been proposed (JP 11(1999)-219059A).

However, the conventional oil application roller provided with a vent hole suffers the following problem. If the user detaches the oil application roller from the fixing device and leaves the roller in the state where the rotation axis thereof runs vertically during use, the oil will be unevenly distributed in the roller due to gravity. This causes the oil to leak from the lower part of the roller through the vent hole to stain documents and the like.

Also, when the user detaches the oil application roller from the fixing device and leaves the roller in the state where the rotation axis thereof runs vertically after use, the problem of an oil leak still occurs.

Further, when the fixing device is heated, the internal pressure inside the roller increases to generate water vapor. As a result, the oil held in the oil application roller is extruded though the vent holes of the seal rings, thereby causing an oil escape from the oil application roller. The interior of the fixing device is stained if the oil escape occurs in the fixing device. In addition, the service life of the oil application roller is shortened since the wasteful oil is discharged from the roller and accelerates oil consumption.

DISCLOSURE OF INVENTION

The present invention has been made to overcome the above-mentioned problems in the prior art. It is an object of the present invention to provide an oil application roller capable of preventing an oil leak when the roller is left in the state where the rotation axis thereof runs vertically and also capable of preventing an oil escape from the roller in a fixing device. It is another object of the present invention to provide a seal ring for use in the oil application roller and a fixing device using the oil application roller.

In order to achieve the above object, an oil application roller according to the present invention includes: a roller at least including an oil holding portion for holding oil and an oil application surface for applying the oil; a gas release hole provided at respective end portions of the roller in a direction of a rotation axis generatrix of the roller; and a seal ring provided at the respective end portions of the roller to liquid-tightly seal the roller. The oil application roller according to the present invention is characterized in that the seal ring has a vent hole extending from the gas release hole to an outside of the seal ring, and the vent hole has a cross-sectional area of not less than 0.01 mm$^2$ and not more than 1 mm$^2$. In this oil application roller, since the cross-sectional area of the vent hole is not less than 0.01 mm$^2$, expanded air and water vapor can be released to the outside of the roller through the vent hole. On the other hand, since the cross-sectional area of the vent hole is not more than 1 mm$^2$, the oil cannot pass through the vent hole easily. Thus, if the oil application roller is left in the state where the rotation axis thereof runs vertically during use, the oil seldom leaks to the outside of the oil application roller through the vent hole of the seal ring.

When the cross-sectional area of the vent hole is less than 0.01 mm$^2$, the expanded air or water vapor generally cannot be released sufficiently to the outside through the vent hole. On the other hand, when the cross-sectional area of the vent hole is more than 1 mm$^2$, the oil passes through the vent hole easily, thereby causing the oil to leak to the outside through the vent hole of the seal ring when the oil application roller is left in the state where the rotation axis thereof runs vertically during use.

In addition, according to the oil application roller of the present invention, since the cross-sectional area of the vent hole is set to be small, even when the temperature of the oil application roller rises in the fixing device, the oil cannot be extruded easily though the vent holes of the seal rings by the expanded air or water vapor.

In the above-mentioned oil application roller of the present invention, it is preferable that the seal ring has an oil reservoir in a concave shape provided at a side in contact with the roller, and the vent hole is provided between the oil reservoir and an outer peripheral surface of the seal ring. According to this preferable example, when the oil application roller is left in the state where the rotation axis thereof runs vertically during use, the portion of the vent hole that faces the outer peripheral surface of the seal ring is kept horizontal. Thus, if the oil accumulates in the vent hole, an oil leak through the vent hole of the seal ring seldom occurs because the oil is not affected by gravity in the portion.

In addition, even if the oil is extruded from the oil holding portion by the expanded air and/or water vapor generated when the temperature of the oil application roller rises in the fixing device, the oil is seldom extruded through the vent holes as a result of the synergistic effect given by the facts that the oil accumulates in the oil reservoirs provided in the seal rings and that the oil cannot pass through the vent holes having a small cross-sectional area.

In this case, it is preferable that the seal ring further comprises a hole at a portion of the oil reservoir, and the vent hole is provided between the hole and an outer peripheral surface of the seal ring. According to this preferable example, even if the oil escapes from the oil holding portion when the oil application roller is left in the state where the rotation axis thereof runs vertically, the oil seldom leaks to the outside of the oil application roller through the vent hole because it takes a long time until the hole is filled with the oil.

In addition, even if the oil is extruded from the oil holding portion by the expanded air and/or water vapor generated when the temperature of the oil application roller rises in the fixing device, the occurrence of an oil escape can be prevented as a result of the synergistic effect given by the facts that the holes provided in the seal rings cannot fill with the oil easily and that the oil cannot pass through the vent holes having a small cross-sectional area.

In this case, it is further preferable that the distance between the center of the seal ring and the peripheral surface of the hole farthest therefrom is 0.98a or less where "a" is the distance between the center of the seal ring and the inner peripheral surface of the oil reservoir. According to this preferable example, when the oil is extruded from the oil holding portion by the expanded air and/or water vapor generated when the oil application roller is heated in the state where the oil application roller is held in a horizontal position during use, the extruded oil accumulates in the peripheral faces of the oil reservoirs rather than the holes. As a result, the oil seldom leaks to the outside of the oil application roller through the vent hole.

Further, in the above-mentioned oil application roller of the present invention, it is preferable that the vent hole has an anfractuous shape. According to this preferable example, the oil escaping from the oil holder to accumulate in the seal rings seldom passes through the vent holes. As a result, the occurrence of an oil leak from the oil application roller when the roller is left in the state where the rotation axis thereof runs vertically and the occurrence of an oil escape from the roller during use can be further reduced.

As specifically described above, according to the oil application roller according to the present invention, the occurrence of an oil leak when the roller is left in the state where the rotation axis thereof runs vertically can be reduced. Thus, the concern that the document or the like might be stained with the oil leaking from the roller also can be reduced. In addition, since the occurrence of an oil escape in the fixing device can be reduced, the fixing device can be prevented from being stained by the oil. Furthermore, since no wasteful oil is discharged from the oil application roller, an extended service life of the oil application roller can be realized.

Further, a seal ring according to the present invention, which is provided at an end portion of an oil application roller for holding oil and applying the oil to a surface to be applied with the oil to liquid-tightly seal the oil application roller, is characterized in that it includes a vent hole extending from a surface at a side to be in contact with the oil application roller to an outside of the oil application roller and that at least a portion of the vent hole has a cross-sectional area of not less than 0.01 mm$^2$ and not more than 1 mm$^2$.

In the above-mentioned seal ring according to the present invention, it is preferable that the seal ring further includes an oil reservoir in a concave shape provided at a side to be in contact with the roller and that the above-mentioned vent hole is provided between the oil reservoir and an outer peripheral surface of the seal ring. Further, in this case, it is preferable that the seal ring further includes a hole provided at a portion of the oil reservoir and that the vent hole is provided between the hole and an outer peripheral surface of the seal ring. Still further, in this case, it is preferable that the distance between the center of the seal ring and the peripheral surface of the hole farthest therefrom is 0.98a or less where "a" is the distance between the center of the seal ring and an inner peripheral surface of the oil reservoir.

In the seal ring according to the present invention, it is preferable that the vent hole has an anfractuous shape.

A fixing device according to the present invention includes a fixing means for fixing toner on a recording material utilizing heat and pressure and an oil application roller for applying release oil to the fixing means. The fixing device is characterized in that an oil application roller according to the present invention is used as the oil application roller.

BRIEF DESCRIPTION OF DRAWINGS

FIG. 2A is a cross-sectional view of an oil application roller according to Example 1 of the present invention, and FIG. 2B is an end view of the same.

FIG. 3A is a cross-sectional view of a seal ring for use in an oil application roller according to Example 2 of the present invention, and FIG. 3B is a plan view of the same.

FIG. 4A is a cross-sectional view of a seal ring for use in an oil application roller according to Example 3 of the present invention, and FIG. 4B is a plan view of the same.

FIG. 7A is a cross-sectional view of a seal ring for use in an oil application roller according to Example 5 of the present invention, and FIG. 7B is a plan view of the same.

FIG. 8A is a cross-sectional view of a seal ring for use in an oil application roller according to Example 6 of the present invention, and FIG. 8B is a plan view of the same.

BEST MODE FOR CARRYING OUT THE INVENTION

Figure 1:
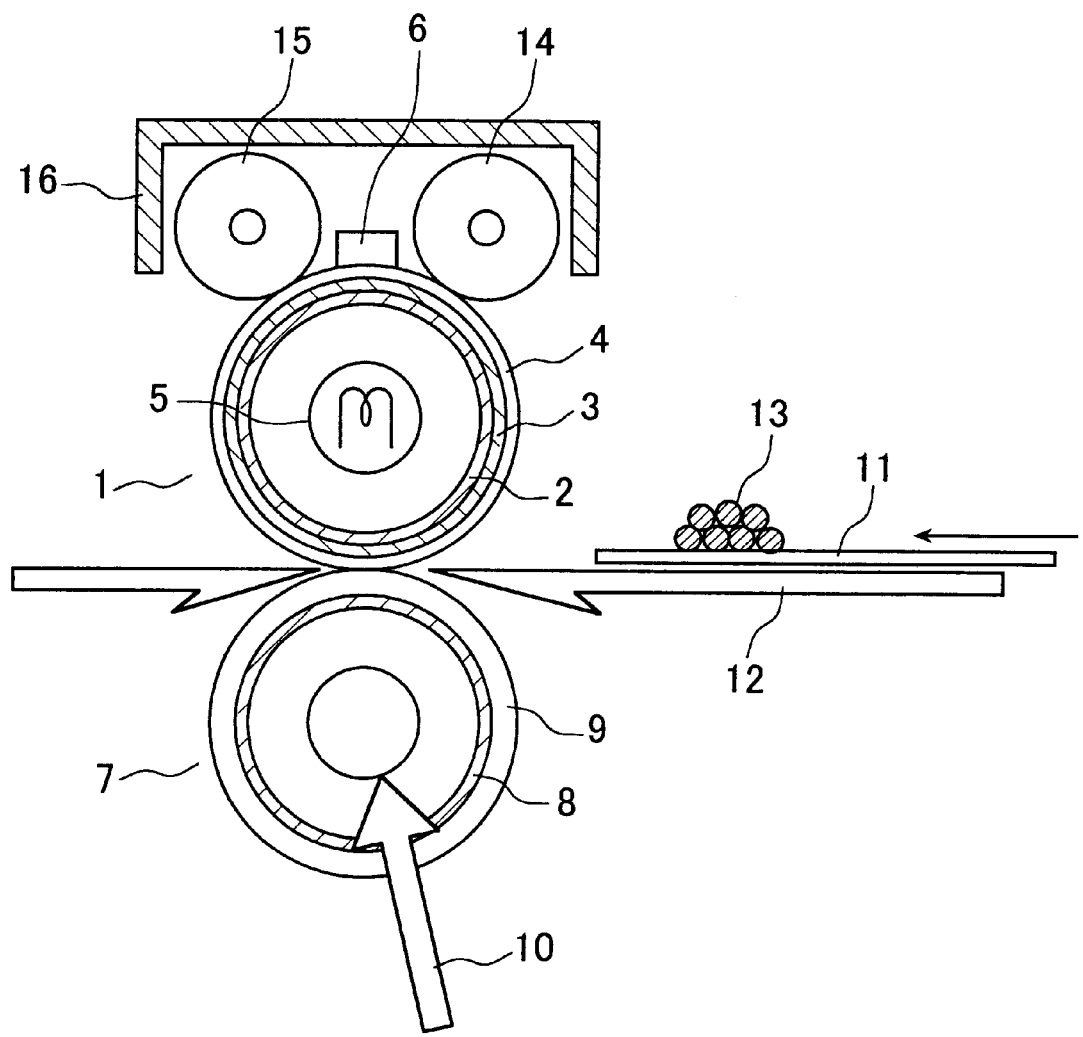
FIG. 1 is a cross-sectional side view of a fixing device according to Example 1 of the present invention.

Hereinafter, the present invention will be described more specifically by way of embodiments.

An oil application roller according to the present invention desirably includes an oil holder, such as a thick porous structure material, a hollow pipe with holes, or the like, used as an oil holding portion; and an oil permeation control layer formed using at least a porous fiber structure material, which is provided on the outer peripheral surface of the oil holder. In this oil application roller, the surface of the oil permeation control layer serves as an oil application surface.

As the thick porous structure material used as the oil holder in the present invention, it is desirable to use a material that is not affected by the oil to be held and can resist the operating temperature. Examples of such a material include Nomex felt, a Nomex braid, a Nomex fiber bundle, a glass fiber bundle, a carbon fiber bundle, a carbon fiber felt, various ceramic sintered porous bodies, a silicone rubber porous sponge, a polyester polyurethane foam, an aramid fiber bundle, a polyimide foam, a melamine foam, and other various plastic sponges, plastic foams, porous bodies, sintered bodies, fiber bundles, etc. Among these, the melamine foam is particularly desirable for the reasons that it has an excellent oil holding capacity due to its high porosity and suitable pore diameter and that it is elastic.

All of the above-mentioned porous materials are required to have a porosity of 50% or more. When the porosity is less than 50%, the porous material can hold only a small amount of oil, which causes the life of the oil application roller to be shortened. Accordingly, although the problem of an oil leak does not occur, it is difficult to obtain a practical oil application roller.

As the hollow pipe with holes used as the oil holder in the present invention, a metal pipe made of aluminum, SUS, or the like and having a plurality of holes desirably is used.

As the porous fiber structure material used for the oil permeation control layer in the present invention, various porous fiber structure materials can be used. However, in view of the uniformity of the structure of solid portions, the structure of pores, etc., a particularly desirable porous fiber structure material is a porous PTFE film produced by drawing polytetrafluoroethylene (PTFE). The thickness of the porous PTFE film is in the range of 0.001 to 1 mm, desirably 0.005 to 0.1 mm. The porosity of the porous PTFE film is in the range of 20 to 98%, desirably 50 to 90%. The mean pore diameter of the porous PTFE film is in the range of 0.05 to 15 $\mu$m, desirably 0.1 to 2 $\mu$m.

Examples of the release oil used in the present invention include various types of silicone oil. More specifically, various types of modified silicone oil such as dimethyl silicone oil, fluorine oil, fluorosilicone oil, phenyl silicone oil, amino modified silicone oil, mercapto modified silicone oil, and the like may be used. They may be used alone or in combinations of two or more types. The viscosity of the release oil is not specifically limited. However, considering practical use, the viscosity of not less than 0.1 mm$^2$/s and not more than 100 mm$^2$/s is desirable.

The oil permeation control layer of the present invention may be a composite of a porous fiber structure material and a mixture of silicone rubber and release oil. In this case, a desirable method for forming the composite is impregnating a porous fiber structure material film with the mixture of silicone rubber and release oil and thereafter, cross-linking the film and the mixture. When the mixture of silicone rubber and release oil is subjected to impregnation and cross-linking, the mixture ratio of the silicone rubber and the release oil generally is set to 2:98. Although the mixture ratio may be determined depending on the desired amount of oil permeation, it is desirable that the amount of the release oil does not exceed this ratio. If the amount of the release oil is larger, the silicone rubber cannot contain all the release oil. As a result, the resultant oil permeation control layer cannot sufficiently be gelated, and oil permeation control thus becomes difficult. Further, the amount of the mixture to be impregnated into the porous fiber structure material can be determined appropriately so that a filling rate of the pores would be 100% or less. Examples of the most suitable silicone rubber include RTV (room temperature vulcanizing) silicone rubber, LTV (low temperature vulcanizing) silicone rubber, HTV (high temperature vulcanizing) silicone rubber, ultraviolet vulcanizing silicone rubber, and the like.

As a method of providing the oil permeation control layer on the outer peripheral surface of the oil holder, it is possible to use a method of adhering the oil permeation control layer to the oil holder by applying heat and pressure with fluororesin such as FEP (fluorinated ethylene propylene resin) intervening between the layer and the oil holder, and a method of adhering the oil permeation control layer to the oil holder using a thermosetting adhesive or the like. When forming an oil permeation control layer using a composite of a porous fiber structure material and a mixture of silicone rubber and release oil, the oil permeation control layer desirably is formed by adhering a porous fiber structure material to the oil holder either by pressure or with an adhesive, applying a not-yet-cross-linked mixture of silicone rubber and release oil to the surface of the porous fiber structure material, and then cross-linking the mixture and the porous fiber structure material. It is also desirable to form the oil permeation control layer by adhering a porous fiber structure material to the oil holder either by pressure or with an adhesive, immersing the porous fiber structure material in the mixture of silicone rubber and release oil so that the pores in the porous fiber structure material is impregnated with the mixture, and then cross-linking the mixture and the porous fiber structure material after wiping off or scraping off excess mixture on the surface of the porous fiber structure material. According to these methods, the oil permeation control layer joined integrally with the oil holder can be obtained. Thus, the separation of the oil permeation control layer effectively can be prevented, and the durability of the oil permeation control layer can be further improved. However, if the durability of the layer is sufficiently high, the oil permeation control layer may be joined integrally with the outer peripheral surface of the oil holder by cross-linking only, without using any adhesive.

The porous fiber structure material used for the oil permeation control layer of the oil application roller according to the present invention may be a conductive porous material containing a conductive substance such as carbon in its solid portions, pores, or both the solid portion and pores. In this case, static electricity can be eliminated due to the conductivity of the conductive material. Thus, trouble such that dust and/or toner adhere(s) to the surface of the oil application roller during storage due to static electricity can be prevented.

The oil application roller according to the present invention includes an oil holder such as a thick porous structure material, a hollow pipe with holes, or the like; and an oil permeation control layer formed using at least a porous fiber structure material, which is provided on the outer peripheral surface of the oil holder. The oil application roller further may include an oil diffusion layer between the oil holder and the oil permeation control layer. In this case, the oil diffusion layer desirably is formed of a material having appropriate flexibility or elasticity to ensure favorable contact with the maiting roller to which oil is applied and capable of achieving excellent oil diffusion. Examples of such a material includes polyester felt, Nomex felt, a silicone rubber sponge, a composite foam of urethane foam and silicone rubber, a melamine foam, a polyimide foam, etc. Further, if necessary, the material may be combined with an elastic body such as fluoro rubber, silicone rubber, or the like to form the oil diffusion layer.

As a material for a seal ring according to the present invention, it is desirable to use a material that is not affected by the oil to be held and can resist the operating temperature. Examples of such a material include heat-resistant resins such as polyacetal, polycarbonate, polyphenylene sulfide, polyether sulphone, polyethylene terephthalate, polyether imide, polyamide imide, polyimide, and the like; various metals such as aluminum, iron, SUS, and the like; various elastic bodies formed of rubber materials such as urethane rubber, silicone rubber, fluoro rubber, fluorosilicone rubber, EPDM (ethylene propylene diene monomer), hydrin rubber, and the like.

The seal ring needs to be provided with a vent hole having a specific cross-sectional area. Accordingly, in view of the ease of processing, heat-resistant resins and metals are desirably used as a material for the seal ring.

The seal ring can be processed into a specific shape by die molding, chipping and grinding, or lamination.

If necessary, the seal ring may further include a hole into which a core shaft of an oil application roller inserted. This hole can be sealed with the core shaft when the core shaft mates with the hole. Thus, there is no concern that oil might leak from the mating portion of the core shaft and the hole when the oil application roller is left in the state where the rotation axis thereof runs vertically. Further, if necessary, an O ring or the like may be inserted into the mating portion of the core shaft and the hole.

The outer diameter of the seal ring according to the present invention desirably is about 2% to 30% smaller than that of the oil application roller. If the outer diameter of the seal ring is only less than 2% smaller than that of the oil application roller, i.e., substantially the same as that of the oil application roller, the oil application roller may not be sufficiently in contact with the fixing member. On the other hand, if the outer diameter of the seal ring is more than 30% smaller than that of the oil application roller, it becomes difficult to cover the gas release hole provided on each end face of the oil application roller.

In the present invention, seal rings at both end portions of the oil application roller need to have a vent hole. In the case where only the seal ring on one side has a vent hole, when the oil held in the oil application roller leans to the side of a vent hole, the so-called "oil-spouting problem" is caused in which the oil is extruded through the vent hole due to the expanded air and/or water vapor generated when the fixing device is heated.

Further, the present invention is characterized in that the vent hole has a cross-sectional area of not less than 0.01 $mm^2$ and not more than 1 $mm^2$. When the cross-sectional area of the vent hole is more than 1 $mm^2$, oil leak occurs shortly after the oil application roller is left in the state where the rotation axis thereof runs vertically during use, for example. On the other hand, when the cross-sectional area of the vent hole is less than 0.01 $mm^2$, the expanded air and/or water vapor generated when the fixing device is heated cannot be released to the outside of the roller easily. Thus, the internal pressure of the oil application roller rises, resulting in deformation or the like of the oil application roller. For this reason, the cross-sectional area of the vent hole is set to be not less than 0.01 $mm^2$ and not more than 1 $mm^2$ in the present invention. It should be noted here that it is only necessary that the smallest portion of the vent hole satisfy this range. That is to say, a cross-sectional area of a specific portion of the vent hole needs to be not less than 0.01 mm² and not more than 1 mm².

Further, it is desirable that the vent hole has a length of 0.1 mm or more. As the vent hole becomes longer, air and water vapor can be released from the oil application roller more easily as compared with the oil.

It is to be noted that if the seal ring includes at least one vent hole, the expanded air and/or water vapor can be released to the outside of the oil application roller.

In the present invention, it is also desirable that the vent hole provided in the seal ring has an anfractuous irregular shape such as a curved shape or zigzag shape. If the vent hole has an anfractuous irregular shape, air and water vapor can be released from the vent hole easily whereas the oil cannot pass therethrough easily. As a result, an oil leak is prevented from occurring when the oil application roller is left in the state where the rotation axis thereof runs vertically.

Further, an oil reservoir in a concave shape provided in the seal ring of the invention may have a cross section of various shapes such as circular, rectangular, and any other irregular shapes. Considering the purpose of storing the oil, it is desirable that the oil reservoir have a depth of not less than 0.5 mm.

Furthermore, a hole provided in the oil reservoir of the seal ring according to the present invention may have a cross section of various shapes such as circular, rectangular, and any other irregular shapes. The hole provided in the oil reservoir can be of any shape as long as a vent hole having a cross-sectional area of not less than 0.01 mm² and not more than 1 mm² can be provided so as to extend from the wall of the hole.

The hole provided in the oil reservoir of the seal ring desirably is positioned on the bottom face of the oil reservoir, which lies in the axial direction of the oil application roller, rather than the inner peripheral surface of the oil reservoir. An oil application roller with this structure is less susceptible to oil escape during use since the oil escaping from the main body of the roller does not accumulate in the hole directly.

Desirably, the distance between the center of the seal ring and the peripheral surface of the hole (provided in the oil reservoir) farthest therefrom is 0.98a or less where "a" is the distance between the center of the seal ring and the inner peripheral surface of the oil reservoir.

As a material for a core shaft used in the oil application roller of the present invention, various types of metals such as aluminum, iron, SUS, and the like are desirable.

As a fixing means used in the present invention, any types of fixing means can be used as long as the oil application roller can be installed therein. As a member onto which toner is fixed, it is desirable to use a heat roller having an elastic body on its surface or a belt having an elastic body. As a surface material, silicone rubber, fluoro rubber, a PFT tube, Teflon coating, etc. having a favorable releasing property are desirable.

Further, it is desirable to use a pressure roller or the like to crush toner by pressure. Toner is crushed by the pressure roller or the like applying a linear load of not less than 0.98 N/cm and not more than 19.6 N/cm.

At the time of transporting the oil application roller of the present invention, the oil application roller may be packed while protecting the vent hole and the surface of the roller by films or the like, for example, if necessary. Alternatively, the vent hole may be sealed with a stopper formed of resin, rubber, metal, or the like. Such films, stopper, etc. should be removed before use.

As a heat source for melting toner, heating members such as a halogen lamp, ceramics, etc. generally are used. However, any types of heat sources may be used, provided that they can generate heat or the like.

The oil application roller according to the present invention was tested for the occurrence of an oil leak from the roller in the state where the oil application roller is left so that the rotation axis thereof runs vertically. Specifically, the oil application roller was left in a fixing device in which the surface temperature of a fixing member was controlled to be 170° C. for 1 hour, after which the oil application roller was left in the state where the rotation axis thereof runs vertically to measure the time period elapsed until oil leaks from the vent hole of the seal ring.

Also, the oil application roller according to the present invention was tested for the occurrence of an oil escape from the roller while the roller is in a fixing device. Specifically, the oil application roller was installed in the fixing device and then subjected to a heat cycle test consisting of 50 cycles in the fixing device while keeping a fixing member still, after which the change in weight of the oil application roller was measured using a scale. The heat cycle test was conducted by allowing the temperature of the oil application roller to rise for 1 hour while controlling the surface temperature of the fixing member at 170° C., and then allowing the oil application roller to cool for 2 hours while leaving the surface temperature of the fixing member uncontrolled. That is, in the heat cycle test, one cycle required 3 hours in total.

Hereinafter, the present invention will be described more specifically by way of specific examples.

EXAMPLE 1

FIG. 1 is a cross-sectional side view of a fixing device according to Example 1 of the present invention.

As shown in FIG. 1, the fixing device according to the present example includes a fixing roller 1 used as a fixing member and a pressure roller 7 used as a pressure member.

The fixing roller 1 includes a hollow roller core metal 2, an elastic layer 3 provided on the outer peripheral surface of the hollow roller core metal 2, and a fluorocarbon resin tube 4 coated on the elastic layer 3. The hollow roller core metal 2 is made of aluminum and has a length of 250 mm, an outer diameter of 28 mm, and a thickness of 1 mm. The elastic layer 3 is made of silicone rubber having a hardness of JIS A30 degrees and has a thickness of 1 mm. The fluorocarbon resin tube 4 is made of PFA and has a surface roughness (Rz) of 1.0 μm and a thickness of 30 μm. The outer diameter of the fixing roller 1 is thus about 30 mm. A 700 W lamp heater 5 used for heating is provided inside the fixing roller 1, and a temperature sensor 6 is placed on the outer peripheral surface of the fixing roller 1. The fixing roller 1 is rotated at a speed of 100 mm/s by the driving force from a driving motor (not shown in the drawing).

Further, a cleaning roller 14 used as a cleaning member and an oil application roller 15 used as an oil application member are placed so as to be in contact with the outer peripheral surface of the fixing roller 1. The cleaning roller 14 and the oil application roller 15 are held by a holder 16.

The cleaning roller 14 is an aluminum hollow roller of 240 mm length, 20 mm outer diameter, and 1 mm thickness, and is pressed against the fixing roller 1 at a pressure of 0.49

N/cm. The oil application roller 15 has an oil holding portion of 240 mm length and 20 mm outer diameter, and is pressed against the fixing roller 1 at a pressure of 0.49 N/cm.

The pressure roller 7 includes a hollow roller core metal 8 and an elastic layer 9 provided on the outer peripheral surface of the hollow roller core metal 8. The hollow roller core metal 8 is made of aluminum and has a length of 250 mm, an outer diameter of 28 mm, and a thickness of 1 mm. The elastic layer 9 is made of silicone rubber having a hardness of JIS A55 degrees and has a thickness of 1.5 mm. The outer diameter of the pressure roller 7 is thus about 30 mm. The pressure roller 7 is pressed against the fixing roller 1 by pressure springs 10, which give a spring force of 147 N to both end portions of the pressure roller 7, respectively. A nip portion having a width of 4.0 mm is thus formed between the pressure roller 7 and the fixing roller 1. The pressure roller 7 is provided in a rotatable manner.

A recording paper 11 onto which color toner 13 has been transferred is conveyed along a guide plate 12. The color toner 13 is fixed on the recording paper 11 after passing through the nip portion between the fixing roller 1 and the pressure roller 7.

Hereinafter, an oil application roller according to the present invention will be described.

FIG. 2A is a cross-sectional view of an oil application roller according to Example 1 of the present invention, and FIG. 2B is an end view of the same.

As shown in FIGS. 2A and 2B, an oil application roller 15 according to the present example includes a core shaft 21; an oil holder 22 provided around the core shaft 21; an oil diffusion layer 23 provided on the surface of the oil holder 22; an oil permeation control layer 24 provided on the surface of the oil diffusion layer 23; and seal rings 25 attached to both end faces of the oil holder 22 to liquid-tightly seal the oil holder 22.

The oil holder 22 is made of polyester polyurethane foam, which has been cut into a cylindrical shape of 6 mm inner diameter and 23 mm outer diameter. The core shaft 21 is made of SUS 416 and has a diameter of 6 mm. The core shaft 21 is inserted into the oil holder 22 and fused therewith. Nomex felt of 2 mm thickness was cut in the shape of a tape of 30 mm width, and this tape was spirally wound around the oil holder 22 and adhered thereto with an adhesive to form the oil diffusion layer 23. A silicone-based adhesive is used as the adhesive.

The oil permeation control layer 24 is formed in the following manner. First, a drawn porous PTFE film (the trade name "Gore-Tex" available from Japan Gore-Tex Inc.), a porous fiber structure material, having a thickness of 40 $\mu$m, a porosity of 75%, and a mean pore diameter of 0.2 $\mu$m is wound around the surface of the oil diffusion layer 23 and adhered thereto with an adhesive. A silicone-based adhesive is used as the adhesive. The adhesive is dotted over the surface of the oil diffusion layer 23. Next, the drawn porous PTFE film is impregnated with a mixture containing silicone rubber (KE 106 available from Shin-Etsu Chemical Co., Ltd.) and silicone oil (KF 96 available from Shin-Etsu Chemical Co., Ltd.) at a ratio of 3:7. After excess mixture is scraped off, the film is heated at 150° C. for 40 minutes to cause cross-linking, thereby forming a composite film used as the oil permeation control layer 24.

The oil holder 22 includes a gas release hole 27 on each end face in the direction of the rotation axis generatrix of the oil holder 22.

In the oil holder (polyester polyurethane foam) 22, amino modified silicone oil (available from Shin-Etsu Shilicone Co., Ltd.: amino equivalent=30000 g/mol, vicinity=1 mm$^2$/s) is dispersed uniformly. Such uniform dispersion of the amino modified silicone oil can be achieved by poring 50 g of the oil into the oil holder 22 from its end face and then rotating the oil application roller 15.

The seal rings 25 are made of polyphenylene sulfide and have an outer diameter of 26 mm, an inner diameter of 6 mm, and a thickness of 5 mm. The seal rings 25 mate with the end faces of the oil holder 22, respectively, after the amino modified silicone oil has been dispersed uniformly in the oil holder 22. Each of the seal rings 25 includes four vent holes 26 that penetrate through the seal ring 25 in the axial direction of the oil application roller 15 so as to extend from the gas release hole 27 of the oil holder 22 to the outside of the seal ring. Each of the vent holes 26 is set to have a length of 5 mm and a cross-sectional area of 0.3 mm$^2$.

The oil application roller 15 having the above-mentioned structure was tested for an oil leak in the state where the oil application roller is left so that the rotation axis thereof runs vertically.

The time period elapsed until the occurrence of an oil leak from the vent holes 26 of the seal ring 25 was measured. As a result, it was found that a time period as long as 30 minutes had elapsed until the oil leak from the vent holes 26 was observed.

Further, the oil application roller 15 was installed in the fixing device, and the oil application roller 15 was tested for the occurrence of an oil escape from the roller. As a result, it was found that the amount of the oil having escaped from the roller was only 28 mg.

EXAMPLE 2

FIG. 3A is a cross-sectional view of a seal ring for use in an oil application roller according to Example 2 of the present invention, and FIG. 3B is a plan view of the same.

As shown in FIGS. 3A and 3B, the seal ring 31 according to the present example is made of polyphenylene sulfide and has an outer diameter of 26 mm and a thickness of 5 mm. The seal ring 31 includes an oil reservoir 33 having an outer diameter of 16 mm and a depth of 4 mm; and a hole 34 having an inner diameter of 6 mm to mate with a core shaft of an oil application roller. The seal ring 31 further includes four vent holes 32 extending from the oil reservoir 33 so as to penetrate the seal ring 31 in the direction substantially perpendicular to the direction of the rotation axis generatrix of the oil application roller. Each of the vent holes 32 is set to have a length of 5 mm and a cross-sectional area of 0.3 mm$^2$.

The seal rings 31 were attached to both end faces of the oil application roller 15 according to Example 1, respectively. Thereafter, the oil application roller 15 was tested for an oil leak in the state where the oil application roller is left so that the rotation axis thereof runs vertically.

The time period elapsed until the occurrence of an oil leak from the vent holes 32 of the seal ring 31 was measured. As a result, it was found that a time period as long as 43 minutes had elapsed until the oil leak from the vent holes 32 was observed.

Further, the oil application roller 15 was installed in the fixing device, and the oil application roller 15 was tested for the occurrence of an oil escape from the roller. As a result, it was found that the amount of the oil having escaped from the oil application roller 15 was only 23 mg.

EXAMPLE 3

FIG. 4A is a cross-sectional view of a seal ring for use in an oil application roller according to Example 3 of the present invention, and FIG. 4B is a plan view of the same.

As shown in FIGS. 4A and 4B, a seal ring 41 according to the present example is made of polyphenylene sulfide and has an outer diameter of 26 mm and a thickness of 5 mm. The seal ring 41 includes an oil reservoir 42 having an outer diameter of 16 mm and a depth of 2.5 mm; four oval holes 43 having a major axis of 4 mm, a minor axis of 2 mm, and a depth of 1.5 mm and provided on the bottom face of the oil reservoir 42 lying in the axial direction of the oil application roller; and a hole 45 having an inner diameter of 6 mm to mate with a core shaft of the oil application roller. The center of each oval hole 43 is 7 mm apart from the center of the seal ring 41 (i.e., the center of the hole 45). The seal ring 41 further includes four vent holes 44 extending from the respective oval holes 43 so as to penetrate the seal ring 41 in the direction substantially perpendicular to the direction of the rotation axis generatrix of the oil application roller. Each of the vent holes 44 is set to have a length of 5 mm and a cross-sectional area of 0.3 mm$^2$.

The seal rings 41 were attached to both end faces of the oil application roller 15 according to Example 1, respectively. Thereafter, the oil application roller 15 was tested for an oil leak in the state where the oil application roller is left so that the rotation axis thereof runs vertically.

The time period elapsed until the occurrence of an oil leak from the vent holes 44 of the seal ring 41 was measured. As a result, it was found that a time period as long as 57 minutes had elapsed until the oil leak from the vent holes 44 was observed.

Further, the oil application roller 15 was installed in the fixing device, and the oil application roller 15 was tested for the occurrence of an oil escape from the roller. As a result, it was found that the amount of the oil having escaped from the oil application roller 15 was only 18 mg.

EXAMPLE 4

Figure 5A:
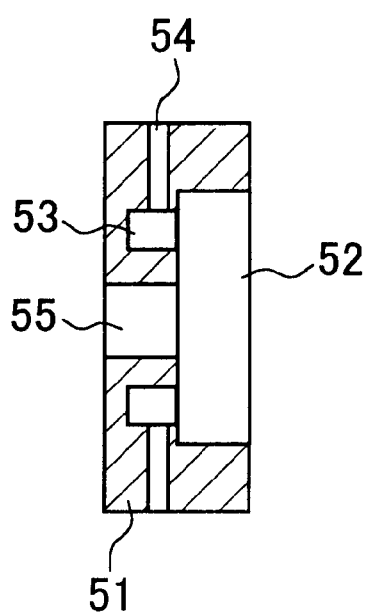
FIG. 5A is a cross-sectional view of a seal ring for use in an oil application roller according to Example 4 of the present invention.
Figure 5B:
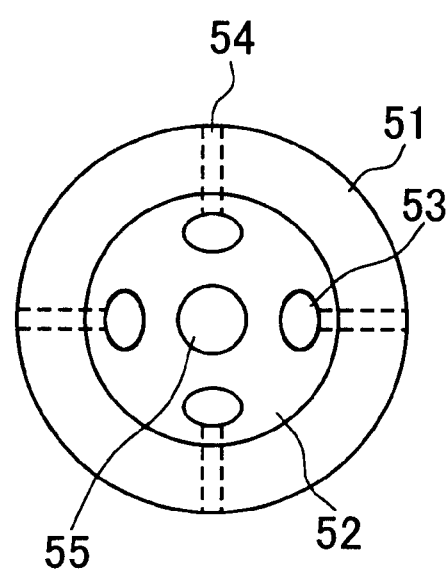
FIG. 5B is a plan view of the same.

FIG. 5A is a cross-sectional view of a seal ring for use in an oil application roller according to Example 4 of the present invention, and FIG. 5B is a plan view of the same.

As shown in FIGS. 5A and 5B, a seal ring 51 according to the present example is made of polyphenylene sulfide and has an outer diameter of 26 mm and a thickness of 5 mm. The seal ring 51 includes an oil reservoir 52 having an outer diameter of 22 mm and a depth of 2.5 mm; four oval holes 53 having a major axis of 4 mm, a minor axis of 2 mm, and a depth of 1.5 mm and provided on the bottom face of the oil reservoir 52 lying in the axial direction of the oil application roller; and a hole 55 having an inner diameter of 6 mm to mate with a core shaft of the oil application roller. The center of each oval hole 53 is 7 mm apart from the center of the seal ring 51 (i.e., the center of the hole 55). The seal ring 51 further includes four vent holes 54 extending from the respective oval holes 53 so as to penetrate the seal ring 51 in the direction substantially perpendicular to the direction of the rotation axis generatrix of the oil application roller. Each of the vent holes 54 is set to have a length of 5 mm and a cross-sectional area of 0.3 mm$^2$.

The seal rings 51 were attached to both end faces of the oil application roller 15 according to Example 1, respectively. Thereafter, the oil application roller 15 was tested for an oil leak in the state where the oil application roller is left so that the rotation axis thereof runs vertically.

The time period elapsed until the occurrence of an oil leak from the vent holes 54 of the seal ring 51 was measured. As a result, it was found that a time period as long as 83 minutes had elapsed until the oil leak from the vent holes 54 was observed.

Further, the oil application roller 15 was installed in the fixing device, and the oil application roller 15 was tested for the occurrence of an oil escape from the roller. As a result, no oil escape from the oil application roller 15 was observed.

Figure 6:
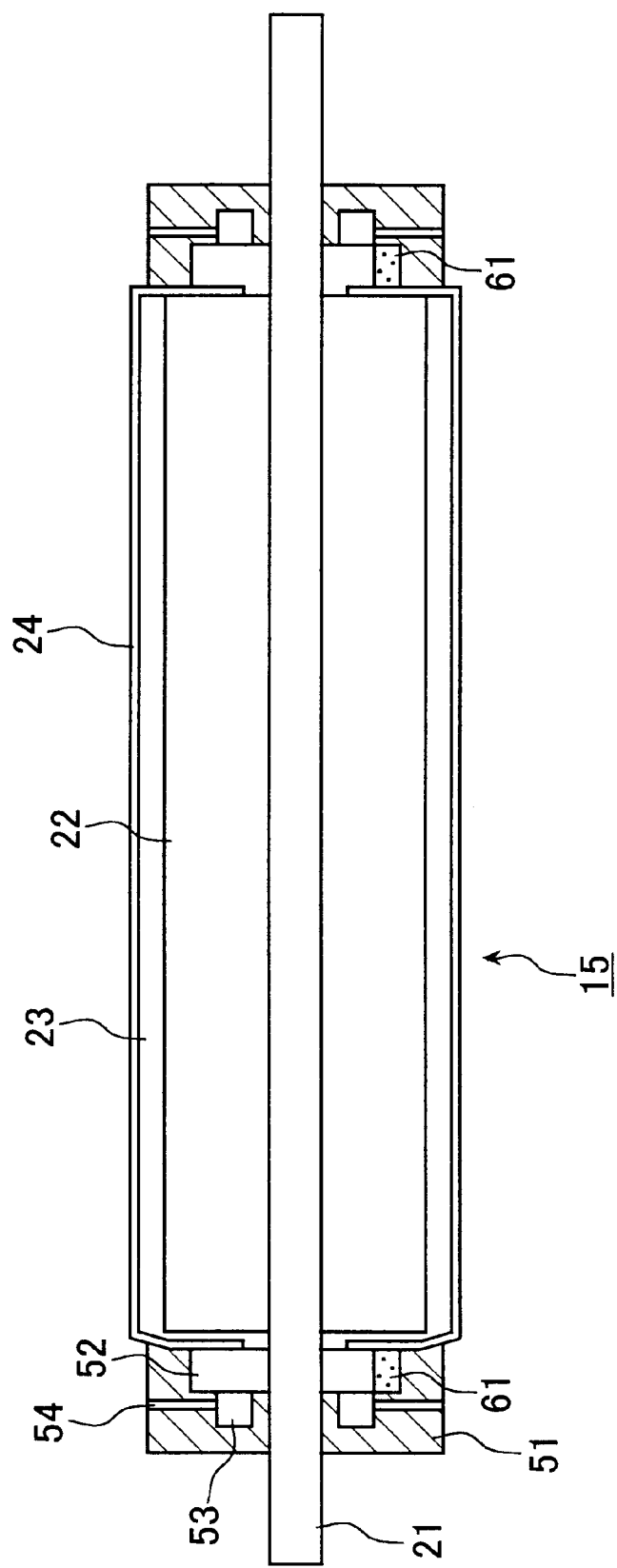
FIG. 6 is a cross-sectional side view of an oil application roller according to Example 4 of the present invention.

Further, the amount of the oil having accumulated in the oil reservoirs 52 of the seal rings 51 attached to the oil application roller 15 was measured. The oil 61 having escaped from the oil application roller 15 accumulated in the oil reservoirs 52 of the seal rings 51 attached to the oil application roller 15, as shown in FIG. 6. The amount of the oil 61 was determined to be 150 mg in total.

EXAMPLE 5

FIG. 7A is a cross-sectional view of a seal ring for use in an oil application roller according to Example 5 of the present invention, and FIG. 7B is a plan view of the same.

As shown in FIGS. 7A and 7B, a seal ring 71 according to the present example is made of polyphenylene sulfide and has an outer diameter of 26 mm and a thickness of 5 mm. The seal ring 71 includes an oil reservoir 72 having an outer diameter of 22 mm and a depth of 2.5 mm; four oval holes 73 having a major axis of 4 mm, a minor axis of 2 mm, and a depth of 1.5 mm and provided on the bottom face of the oil reservoir 72 lying in the axial direction of the oil application roller; and a hole 75 having an inner diameter of 6 mm to mate with a core shaft of the oil application roller. The center of each oval hole 73 is 7 mm apart from the center of the seal ring 71 (i.e., the center of the hole 75). The seal ring 71 further includes four vent holes 74 extending from the respective oval holes 73 so as to penetrate the seal ring 71 in the direction substantially perpendicular to the direction of the rotation axis generatrix of the oil application roller. Each vent hole 74 has an anfractuous irregular shape (curving shape) and is formed by combining a plurality of semicircular vent holes each having a diameter of 2 mm and a cross-sectional area of 0.3 mm$^2$.

The seal rings 71 were attached to both end faces of the oil application roller 15 according to Example 1, respectively. Thereafter, the oil application roller 15 was tested for an oil leak in the state where the oil application roller is left so that the rotation axis thereof runs vertically.

The time period elapsed until the occurrence of an oil leak from the vent holes 74 of the seal ring 71 was measured. As a result, it was found that a time period as long as 93 minutes had elapsed until the oil leak from the vent holes 74 was observed.

Further, the oil application roller 15 was installed in the fixing device, and the oil application roller 15 was tested for the occurrence of an oil escape from the roller. As a result, no oil escape from the oil application roller 15 was observed.

EXAMPLE 6

FIG. 8A is a cross-sectional view of a seal ring for use in an oil application roller according to Example 6 of the present invention, and FIG. 8B is a plan view of the same.

As shown in FIGS. 8A and 8B, a seal ring 81 according to the present example is made of polyphenylene sulfide and has an outer diameter of 26 mm and a thickness of 5 mm. The seal ring 81 includes an oil reservoir 82 having an outer diameter of 22 mm and a depth of 2.5 mm; four oval holes 83 having a major axis of 4 mm, a minor axis of 2 mm, and a depth of 1.5 mm and provided on the bottom face of the oil reservoir 82 lying in the axial direction of the oil application roller; and a hole 85 having an inner diameter of 6 mm to mate with a core shaft of the oil application roller.

The center of each oval hole 83 is 7 mm apart from the center of the seal ring 81 (i.e., the center of the hole 85). The seal ring 81 further includes four vent holes 84 extending from the respective oval holes 83 so as to penetrate the seal ring 81 in the direction substantially perpendicular to the direction of the rotation axis generatrix of the oil application roller. Each vent hole 84 has an anfractuous irregular shape (zigzag shape) and is formed by combining a plurality of linear vent holes, some inclining to right by 45° and the rest inclining to left by 45°, each having a length of 2 mm and a cross-sectional area of 0.3 mm², alternately.

The seal rings 81 were attached to both end faces of the oil application roller 15 according to Example 1, respectively. Thereafter, the oil application roller 15 was tested for an oil leak in the state where the oil application roller is left so that the rotation axis thereof runs vertically.

The time period elapsed until the occurrence of an oil leak from the vent holes 84 of the seal ring 81 was measured. As a result, it was found that a time period as long as 89 minutes had elapsed until the oil leak from the vent holes 84 was observed.

Further, the oil application roller 15 was installed in the fixing device, and the oil application roller 15 was tested for the occurrence of an oil escape from the roller. As a result, no oil escape from the oil application roller 15 was observed.

EXAMPLE 7

Three types of seal rings were fabricated with the same configuration as that used in Example 1 except that the cross-sectional area of the vent holes 26 is 0.01 mm², 0.1 mm², and 1.0 mm², respectively. Each pair of these seal rings was attached to the oil application roller 15 according to Example 1. Thereafter, the oil application roller 15 was tested for an oil leak in the state where the oil application roller is left so that the rotation axis thereof runs vertically.

The time periods elapsed until the occurrence of an oil leak from the vent holes having a cross-sectional area of 0.01 mm², 0.1 mm², and 1.0 mm², respectively, were measured. As a result, it was found that time periods as long as 60 minutes, 45 minutes, and 20 minutes had elapsed until the oil leak from the vent holes having a cross-sectional area of 0.01 mm², 0.1 mm², and 1.0 mm² was observed, respectively.

Further, the oil application roller 15 with each pair of the seal rings was installed in the fixing device, and the oil application roller 15 was tested for the occurrence of an oil escape from the roller. As a result, it was found that the amounts of the oil having escaped from vent holes having a cross-sectional area of 0.01 mm², 0.1 mm², and 1.0 mm² were only 15 mg, 23 mg, and 32 mg, respectively.

COMPARATIVE EXAMPLE 1

An oil application roller with the same configuration as that of Example 1 was fabricated without providing the seal rings 25. The oil application roller was tested for an oil leak in the state where the oil application roller is left so that the rotation axis thereof runs vertically.

The time period elapsed until the occurrence of an oil leak from the gas release hole 27 of the oil application roller was measured. As a result, it was found that only 1 minute had elapsed until the oil leak from the gas release hole 27 was observed.

Further, the oil application roller was installed in the fixing device, and the oil application roller was tested for the occurrence of an oil escape from the roller. As a result, it was found that the amount of the oil escaped was as great as 400 mg.

COMPARATIVE EXAMPLE 2

Seal rings were fabricated with the same configuration as that used in Example 1 except that the cross-sectional area of the vent holes 26 is 2.0 mm². The seal rings were attached to the oil application roller according to Example 1. Thereafter, the oil application roller 15 was tested for an oil leak in the state where the oil application roller is left so that the rotation axis thereof runs vertically.

The time period elapsed until the occurrence of an oil leak from the vent holes 26 of the seal ring was measured. As a result, it was found that only 3 minutes had elapsed until the oil leak from the vent holes 26 was observed.

Further, the oil application roller was installed in the fixing device, and the oil application roller was tested for the occurrence of an oil escape from the roller. As a result, it was found that the amount of the oil escaped was as great as 250 mg.

COMPARATIVE EXAMPLE 3

Seal rings were fabricated with the same configuration as that used in Example 1 except that the cross-sectional area of the vent holes 26 is 0.005 mm². The seal rings were attached to the oil application roller according to Example 1.

Then, the oil application roller was installed in the fixing device and heated. As a result, the outer diameter of the oil application roller, 27 mm before heating, was expanded to 35 mm. In addition, much air accumulation was observed under the oil permeation control layer.

As specifically described above, when the oil application roller was tested for the occurrence of an oil leak from the roller in the state where the oil application roller is left so that the rotation axis thereof runs vertically, no oil leak was observed until the time period sufficiently longer than 5 minutes, which is the typical time period that the roller might be left during use, had elapsed in Examples 1 to 7. On the other hand, in Comparative Example 2, an oil leak was observed within the typical time period (about 5 minutes at the maximum) that the roller might be left during use.

Further, when the oil application roller was tested for the occurrence of an oil escape, the amount of the oil having escaped from the roller was sufficiently smaller than 100 mg, which is the typical amount of the oil escaping during use, or no oil escape was observed in Examples 1 to 7. On the other hand, in Comparative Example 2, the amount of the oil having escaped from the oil application roller was sufficiently greater than the typical amount (100 mg) of the oil escaping during use.

Furthermore, in Examples 1 to 7, it was confirmed that the oil application rollers suffered no changes in its outer diameter and hence, it is understood that no air would accumulate under the oil permeation control layer. On the other hand, in Comparative Example 3, it was confirmed that the oil application roller suffered a change in its outer diameter and hence, it is understood that air would accumulate under the oil permeation control layer.

Thus, it is understood that Examples 1 to 7 can be applied for practical use.

Industrial Applicability

The present invention can provide an oil application roller capable of preventing an oil leak when the roller is left in the state where the rotation axis thereof runs vertically and also capable of preventing an oil escape from the roller in a fixing device because expanded air and water vapor can be released from the oil application roller easily through vent holes whereas oil cannot pass the vent holes easily.

What is claimed is:

1. An oil application roller comprising:
a roller at least comprising an oil holding portion for holding oil and an oil application surface for applying the oil;
a gas release hole provided at respective end portions of the roller in a direction of a rotation axis generatrix of the roller; and
a seal ring provided at the respective end portions of the roller to liquid-tightly seal the roller,
wherein the seal ring has a vent hole extending from the gas release hole to an outside of the seal ring, and
the vent hole has a cross-sectional area of not less than 0.01 mm$^2$ and not more than 1 mm$^2$.

2. The oil application roller according to claim 1,
wherein the seal ring has an oil reservoir in a concave shape provided at a side in contact with the roller, and
the vent hole is provided between the oil reservoir and an outer peripheral surface of the seal ring.

3. The oil application roller according to claim 2,
wherein the seal ring further comprises a hole at a portion of the oil reservoir, and
the vent hole is provided between the hole and an outer peripheral surface of the seal ring.

4. The oil application roller according to claim 3,
wherein a distance between a center of the seal ring and a peripheral surface of the hole farthest therefrom is 0.98a or less where "a" is a distance between the center of the seal ring and an inner peripheral surface of the oil reservoir.

5. The oil application roller according to claim 1,
wherein the vent hole has an anfractuous shape.

6. A seal ring to be provided at an end portion of an oil application roller for holding oil and applying the oil to a surface to be applied with the oil, the seal ring being provided to liquid-tightly seal the roller, comprising:
a vent hole extending from a surface at a side to be in contact with the oil application roller to an outside of the oil application roller,
wherein the vent hole has a cross-sectional area of not less than 0.01 mm$^2$ and not more than 1 mm$^2$.

7. A seal ring according to claim 6 further comprising:
an oil reservoir in a concave shape provided at a side to be in contact with the roller,
wherein the vent hole is provided between the oil reservoir and an outer peripheral surface of the seal ring.

8. A seal ring according to claim 7 further comprising:
a hole provided at a portion of the oil reservoir,
wherein the vent hole is provided between the hole and an outer peripheral surface of the seal ring.

9. A seal ring according to claim 8,
wherein a distance between a center of the seal ring and a peripheral surface of the hole farthest therefrom is 0.98a or less where "a" is a distance between the center of the seal ring and an inner peripheral surface of the oil reservoir.

10. A seal ring according to claim 6,
wherein the vent hole has an anfractuous shape.

11. A fixing device comprising:
a fixing means for fixing toner on a recording material utilizing heat and pressure; and
an oil application roller for applying release oil to the fixing means,
wherein an oil application roller according to claim 1 is used as the oil application roller.

* * * * *